US007817017B1

(12) United States Patent
Benun et al.

(10) Patent No.: US 7,817,017 B1
(45) Date of Patent: Oct. 19, 2010

(54) TELEVISION AUDIO MONITOR METHOD AND SYSTEM

(76) Inventors: Andrew J. Benun, 433 N. Clinton St., Orange, CA (US) 92867; Frederick Hohenadel, 6501 Red Hook Plaza, Suite 201, St. Thomas, VI (US) 00802; Daniel Haddon, 10-1 Hull Bay, St. Thomas, VI (US) 00802

( * ) Notice: Subject to any disclaimer, the term of this patent is extended or adjusted under 35 U.S.C. 154(b) by 69 days.

(21) Appl. No.: 11/210,195

(22) Filed: Aug. 22, 2005

Related U.S. Application Data

(60) Provisional application No. 60/608,211, filed on Sep. 9, 2004.

(51) Int. Cl.
*G08B 3/00* (2006.01)
*G05B 19/02* (2006.01)
*H04H 20/71* (2008.01)
*H04R 29/00* (2006.01)

(52) U.S. Cl. ............................. 340/384.1; 340/825.24; 455/3.01; 455/3.04; 455/3.06; 348/14.02; 348/14.05; 381/58; 381/77; 725/38; 725/81

(58) Field of Classification Search ............. 340/384.1, 340/825.24
See application file for complete search history.

(56) References Cited

U.S. PATENT DOCUMENTS 4,665,559 A 5/1987 Benun
4,845,751 A * 7/1989 Schwab ...................... 381/311
4,933,988 A 6/1990 Thibault
5,161,250 A 11/1992 Ianna et al.
5,666,658 A 9/1997 Borchardt
6,212,282 B1 * 4/2001 Mershon ...................... 381/77
6,300,880 B1 10/2001 Sitnik
6,301,367 B1 10/2001 Boyden
6,404,891 B1 * 6/2002 Seitz et al. .................. 381/107
6,760,595 B2 7/2004 Inselberg
6,782,238 B2 8/2004 Burg et al.
6,931,136 B2 * 8/2005 Huang ......................... 381/77
6,987,946 B2 1/2006 Sinclair
6,987,947 B2 * 1/2006 Richenstein et al. ....... 455/3.06
7,190,795 B2 * 3/2007 Simon ......................... 381/60

* cited by examiner

*Primary Examiner*—Donnie L Crosland
(74) *Attorney, Agent, or Firm*—Dennis W. Beech

(57) ABSTRACT

The present invention may be used for selectively listening to multiple audio signal sources in a local area. Multiple audio signals from multiple audio signal sources may be combined in a wireless transmitter. The combined audio signals may be converted to an electromagnetic signal for transmission to multiple personal receivers. Each of the audio signal sources may be identified by a unique, visible channel designator. The electromagnetic signal may be received by the personal receivers and reconverted into each of the audio signals. The audio signals may be detected in the personal receivers to identify each to an audio signal source. A user may select a specific audio signal source for a personal receiver and the audio signal may be output to an earphone.

3 Claims, 2 Drawing Sheets

TELEVISION AUDIO MONITOR METHOD AND SYSTEM

This application claims the benefit of U.S. Provisional Application 60/608,211, filed on Sep. 9, 2004.

BACKGROUND OF THE INVENTION

This invention relates to devices for listening to the audio portion of live or recorded television sports programs, events and the like. The new method and system may allow listening to the audio portion of a video program in an environment that may include multiple persons that may create a background noise condition that may make normal sound speaker audio transmission difficult to hear or understand.

Many establishments, as for example, sports bars or places of public gatherings, may provide television or video monitors for persons to view images and sounds of sports programs that may be live or recorded. Often these venues may be noisy audio environments due to the number of persons present and the activities or conversations taking place. Many establishments may use on screen words for viewers to read in order to understand the voice portion of a television presentation. While this may overcome the environment noise conditions that prevent the hearing of the audio portion of a program, it may require persons to unduly concentrate on a video program in a location where they may wish to simultaneously interact with others present.

Fixed locations in establishments for connecting an earphone headset may also be used to listen to an audio transmission, but this may be unduly confining and may not be used in sports bars or other public gathering venues.

SUMMARY OF THE INVENTION

The present invention is directed to methods and systems for selectively listening to multiple audio signal sources in a local area. Multiple audio signals from multiple audio signal sources may be combined in a wireless transmitter. The combined audio signals may be converted to an electromagnetic signal for transmission to multiple personal receivers. Each of the audio signal sources may be identified by a unique, visible channel designator. The electromagnetic signal may be received by the personal receivers and reconverted into each of the audio signals. The audio signals may be detected in the personal receivers to identify each to an audio signal source. A user may select a specific audio signal source for a personal receiver and the audio signal may be output to an earphone.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
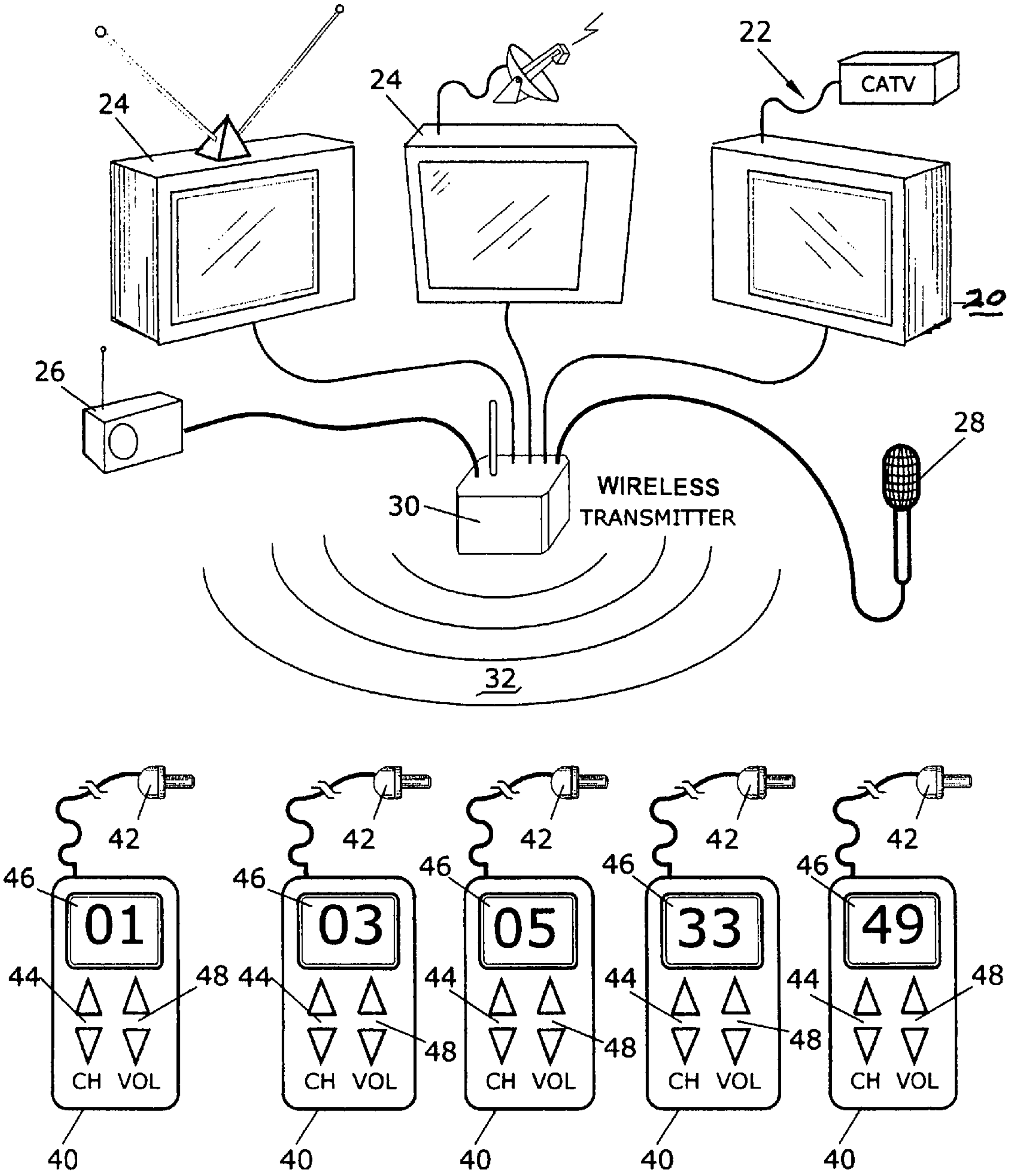
FIG. 1 illustrates a diagram of a television audio monitor system according to an embodiment of the invention.

Referring to FIG. 1, multiple audio signal sources 20 that may originate from cable television 22, broadcast television devices 24, radios 26, live audio programming 28, sub/second audio program (SAP) sources and the like, may have the sound portion of any signal transmitted by wire or other method to a wireless transmitter 30 of a television audio monitor system 10. The wireless transmitter 30 may convert the combined audio signal sources 20 to an electromagnetic wave signal 32 for transmitting a local area wireless audio broadcast signal to be received by one or more personal receivers 40.

The personal receivers 40 may reconvert the electromagnetic wave signal 32 to identify by a detector the various audio sources 20 to a specific audio signal source 20 designation to allow selection by a user to listen to the audio portion of a specific program. The personal receiver 40 may have one or more earphones 42 that may be placed over or inserted in a users ear for listening.

Figure 2:
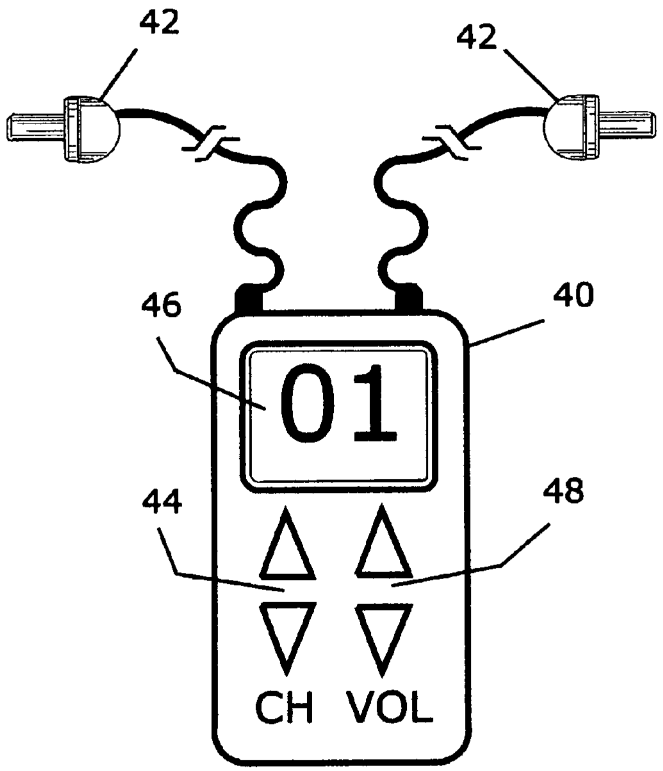
FIG. 2 illustrates a front elevation view of a personal receiver according to an embodiment of the invention.
Figure 3:
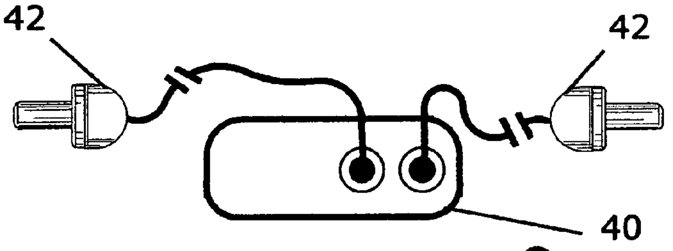
FIG. 3 illustrates a top view of a personal receiver according to an embodiment of the invention.

Referring to FIGS. 2 and 3, the personal receiver 40 may have a channel selection device 44 and channel display device 46 to allow a user to select a specifically identified audio source as established by a particular establishment. The establishment may provide a visible identification for each audio signal source that may be visible to users for selecting the channel identification for desired audio listening. If more than one earphone may be connected to a personal receiver 40, multiple users may listen to the same channel or an earphone may be placed in each ear of a user.

Figure 4:
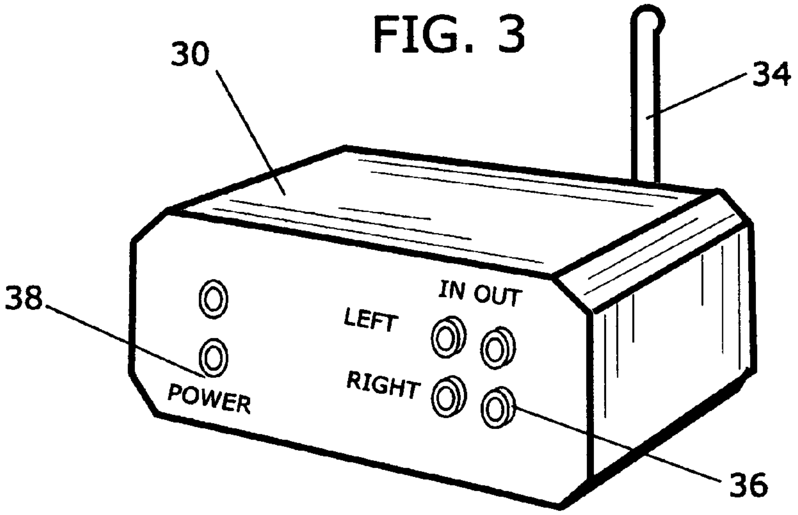
FIG. 4 illustrates a perspective elevation view of a wireless transmitter according to an embodiment of the invention.

Referring to FIG. 4, the wireless transmitter 30 may have a transmit antenna 34. There may be input signal and output signal connectors 36 for receipt of audio signal sources and to issue or provide a duplicate audio copy for possible use by another associated device. There may be a power source on/off control switch 38. The wireless transmitter 30 may have a multiplexer for combining the audio signals of the audio signal sources. There may be a converter in communication with the mixer to convert the combined audio signal to an electromagnetic wave signal for transmission through transmit antenna 34. While the television audio monitor system 10 has been described using electromagnetic wave transmission, other transmission medium may be used, such as, infrared and other wireless transmission methods.

While the invention has been particularly shown and described with respect to the illustrated embodiments thereof, it will be understood by those skilled in the art that the foregoing and other changes in form and details may be made therein without departing from the spirit and scope of the invention.

We claim:

1. A method for selectively viewing and listening to a plurality of visual and audio signal sources in a food and drink establishment comprising:

disposing a plurality of monitors that each have an audio signal source and a visual unique channel designator in a room of said food and drink establishment;

combining in a wireless transmitter each of said audio signal sources and said visual unique channel designators to form a combined signal;

transmitting said combined signal to a plurality of personal receivers;

reconverting said combined signal for each of said audio signal sources and said visual unique channel designators;

detecting each of said audio signal sources and said visual unique channel designators to identify each of said monitors;

selecting a specific audio signal source on at least one of said personal receivers; and outputting said specific audio signal source to a single ear earphone insertable in a user's ear.

2. The method as in claim 1 wherein said wireless transmitter is a single channel wireless transmitter connected to each of said audio signal sources and each of said single channel wireless transmitters is unique to one of said audio signal sources.

3. The method as in claim 2 wherein each of said single channel wireless transmitters transmits a unique electromagnetic signal.

* * * * *